(12) United States Patent
Riocreux (10) Patent No.: US 11,288,207 B2
(45) Date of Patent: Mar. 29, 2022

(54) APPARATUS AND METHOD FOR PROCESSING ADDRESS TRANSLATION AND INVALIDATION TRANSACTIONS

(71) Applicant: Arm Limited, Cambridge (GB)

(72) Inventor: Peter Andrew Riocreux, Cheadle (GB)

(73) Assignee: Arm Limited, Cambridge (GB)

( * ) Notice: Subject to any disclaimer, the term of this patent is extended or adjusted under 35 U.S.C. 154(b) by 66 days.

(21) Appl. No.: 16/834,171

(22) Filed: Mar. 30, 2020

(65) Prior Publication Data

US 2021/0303479 A1 Sep. 30, 2021

(51) Int. Cl.
*G06F 12/1045* (2016.01)
*G06F 9/46* (2006.01)
(Continued)

(52) U.S. Cl.
CPC .......... *G06F 12/1045* (2013.01); *G06F 9/467* (2013.01); *G06F 12/084* (2013.01); *G06F 12/0833* (2013.01)

(58) Field of Classification Search
CPC .... G06F 9/467; G06F 12/0833; G06F 12/084; G06F 12/1045
See application file for complete search history.

(56) References Cited

U.S. PATENT DOCUMENTS

| 9,342,256 B2 * | 5/2016 | Peterson | G06F 3/0688 |
| 2015/0242319 A1 * | 8/2015 | Evans | G06F 12/109 711/207 |

OTHER PUBLICATIONS

Robert Bedichek, "Some Efficient Architecture Simulation Techniques," Proceedings of the Winter 1990 USENIX Conference, Jan. 22-26, 1990, 12 pages.

* cited by examiner

*Primary Examiner* — Aracelis Ruiz
(74) *Attorney, Agent, or Firm* — Nixon & Vanderhye P.C.

(57) ABSTRACT

Apparatus comprises address translation circuitry configured to access translation data defining a set of memory address translations; transaction handling circuitry to receive translation transactions and to receive invalidation transactions, each translation transaction defining one or more input memory addresses in an input memory address space to be translated to respective output memory addresses in an output memory address space, in which the transaction handling circuitry is configured to control the address translation circuitry to provide the output memory address as a translation response; in which each invalidation transaction defines at least a partial invalidation of the translation data; transaction tracking circuitry to associate an invalidation epoch, of a set of at least two invalidation epochs, with each translation transaction and with each invalidation transaction; and invalidation circuitry to store data defining a given invalidation transaction and, for translation transactions having the same invalidation epoch as the given invalidation transaction and handled by the address translation circuitry subsequent to the invalidation circuitry storing the data defining the given invalidation transaction, to process those translation transactions to indicate that a translation transaction is invalidated when the invalidation defined by the given invalidation transaction applies to that translation transaction; the invalidation circuitry being configured to forward at least an acknowledgement of the invalidation transaction for further processing by other apparatus in response to storage of the data by the invalidation circuitry.

17 Claims, 9 Drawing Sheets

(51) Int. Cl.
*G06F 12/084* (2016.01)
*G06F 12/0831* (2016.01)

APPARATUS AND METHOD FOR PROCESSING ADDRESS TRANSLATION AND INVALIDATION TRANSACTIONS

BACKGROUND

This disclosure relates to data processing.

Memory Management allows the building of data processing systems with multiple virtual address maps, so that each application running on an operating system can have its own virtual memory mappings. Each application will be located in a separate address space in physical memory. The MMU maps memory addresses used by an application, called virtual addresses, into physical addresses in memory using translation tables. Translation tables are for example tree-shaped hierarchical table data structures created by software in memory.

MMU hardware generally traverses the translation tables to accomplish virtual address translation. Traversing a translation table can involve performing several memory accesses to read the translation tables.

The source of the translation information or tables is the system which controls and oversees the translation process, which may typically be an operating system (OS) or a hypervisor. For various reasons, that overseeing system may have a requirement from time to time to invalidate at least a part of the translation information.

SUMMARY

In an example arrangement there is provided apparatus comprising:

address translation circuitry configured to access translation data defining a set of memory address translations;

transaction handling circuitry to receive translation transactions and to receive invalidation transactions, each translation transaction defining one or more input memory addresses in an input memory address space to be translated to respective output memory addresses in an output memory address space, in which the transaction handling circuitry is configured to control the address translation circuitry to provide the output memory address as a translation response;

in which each invalidation transaction defines at least a partial invalidation of the translation data;

transaction tracking circuitry to associate an invalidation epoch, of a set of at least two invalidation epochs, with each translation transaction and with each invalidation transaction; and invalidation circuitry to store data defining a given invalidation transaction and, for translation transactions having the same invalidation epoch as the given invalidation transaction and handled by the address translation circuitry subsequent to the invalidation circuitry storing the data defining the given invalidation transaction, to process those translation transactions to indicate that a translation transaction is invalidated when the invalidation defined by the given invalidation transaction applies to that translation transaction;

the invalidation circuitry being configured to forward at least an acknowledgement of the invalidation transaction for further processing by other apparatus in response to storage of the data by the invalidation circuitry.

In another example arrangement there is provided a method comprising:

accessing translation data defining a set of memory address translations;

receiving translation transactions and to receive invalidation transactions, each translation transaction defining one or more input memory addresses in an input memory address space to be translated to respective output memory addresses in an output memory address space, in which each invalidation transaction defines at least a partial invalidation of the translation data;

providing the output memory address as a translation response;

associating an invalidation epoch, of a set of at least two invalidation epochs, with each translation transaction and with each invalidation transaction; and storing data defining a given invalidation transaction and, for translation transactions having the same invalidation epoch as the given invalidation transaction and handled subsequent to the storing of the data defining the given invalidation transaction, and processing those translation transactions to indicate that a translation transaction is invalidated when the invalidation defined by the given invalidation transaction applies to that translation transaction; and forwarding at least an acknowledgement of the invalidation transaction for further processing in response to the storing of the data by the invalidation circuitry.

In another example arrangement there is provided a computer program for controlling a host data processing apparatus to provide an instruction execution environment comprising:

address translation circuitry configured to access translation data defining a set of memory address translations;

transaction handling circuitry to receive translation transactions and to receive invalidation transactions, each translation transaction defining one or more input memory addresses in an input memory address space to be translated to respective output memory addresses in an output memory address space, in which the transaction handling circuitry is configured to control the address translation circuitry to provide the output memory address as a translation response;

in which each invalidation transaction defines at least a partial invalidation of the translation data;

transaction tracking circuitry to associate an invalidation epoch, of a set of at least two invalidation epochs, with each translation transaction and with each invalidation transaction; and invalidation circuitry to store data defining a given invalidation transaction and, for translation transactions having the same invalidation epoch as the given invalidation transaction and handled by the address translation circuitry subsequent to the invalidation circuitry storing the data defining the given invalidation transaction, to process those translation transactions to indicate that a translation transaction is invalidated when the invalidation defined by the given invalidation transaction applies to that translation transaction;

the invalidation circuitry being configured to forward at least an acknowledgement of the invalidation transaction for further processing by other apparatus in response to storage of the data by the invalidation circuitry.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Overview of Apparatus

Figure 1:
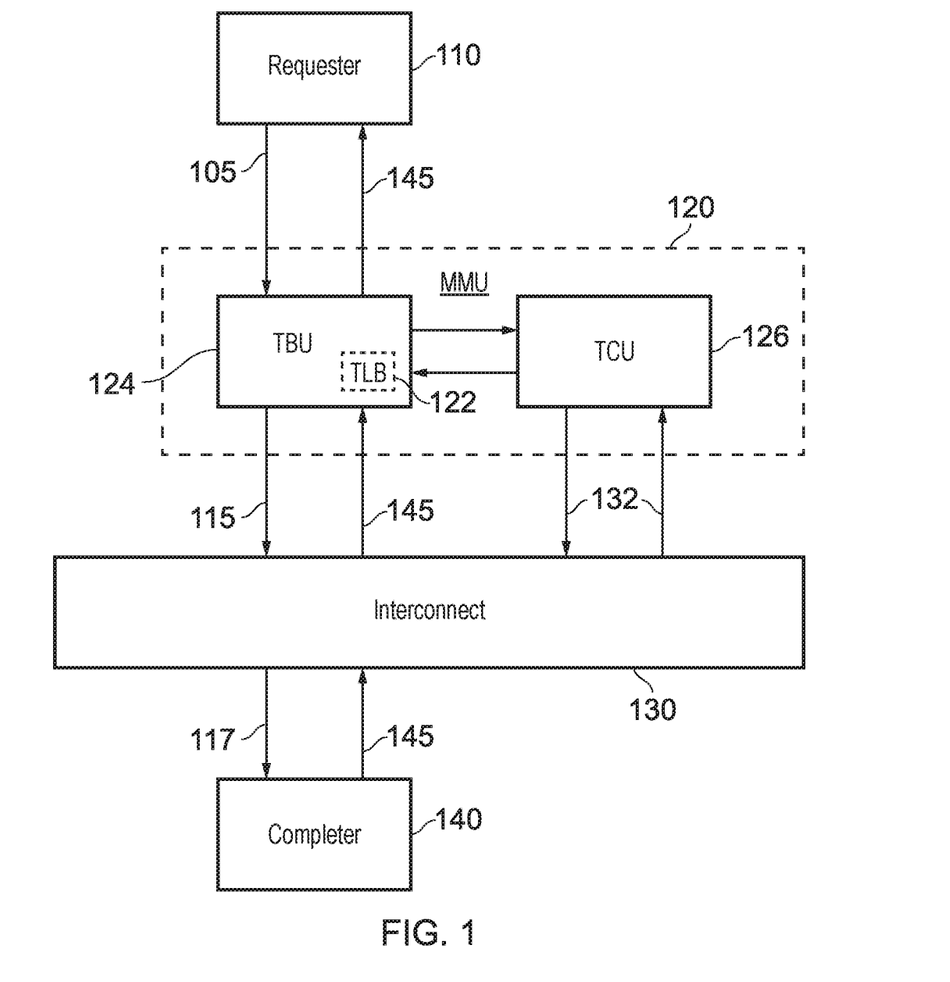
FIG. 1 schematically illustrates a data processing system.

FIG. 1 schematically illustrates a data processing apparatus 100 comprising a requesting device or requester 110, such as a processing element (PE) or the like, which generates as part of its operation memory access transactions. The memory access transactions are defined according to input memory addresses in an input memory address space, such as virtual memory addresses (VAs) in a virtual memory address space (VAS). The use of VAs will be discussed further below.

FIG. 1 also shows a memory management unit (MMU) 120 which translates the address(es) associated with the memory access transactions 105 from input memory address(es) into output memory address(es) in an output memory address space, such as physical address(es) (PAs) in a physical address space (PAS). The MMU forwards translated transactions 115 to interconnect circuitry 130 which provides routing 117 for the transactions to a completer device 140 such as a main memory and/or cache memory and for the return of a transaction response 145 ultimately to the requester device 110.

Therefore, a basic view of the apparatus of FIG. 1 is that an upstream device (such as the requester 110) can access information at a downstream device (such as the completer 140, optionally via an interconnect such as the interconnect 130) via the MMU 120 to translate memory addresses between those in an address space used at the upstream device and those used in an address space at the downstream device. The accesses can be, for example, read accesses, write accesses, accesses to detect or change a current coherency status of data stored at the downstream device, or other types of access.

The MMU 120 comprises a translation buffer unit (TBU) which may (as discussed below) include a translation lookaside buffer (TLB) 122, and a translation control unit (TCU) 126.

As mentioned, the TBU 124 may make use of a translation lookaside buffer (TLB) 122. As part of the handling of memory access transactions as mentioned above, a VA, within a VAS referenced by the requester 110, needs to be translated to a PA in a PAS by which system memory is addressed (for example by the completer circuitry 140) at an electrical level. This translation is carried out by the TBU 124, though if the TBU 124 is unable to service a particular translation it obtains the required information from the TCU 126 as discussed below.

The TCU 126 has an interface 132 to the interconnect 130, which it uses to conduct activities such as page table walks and retrieving commands from a memory-based queue or buffer (both of which are discussed below).

Note that although the TLB 122 is shown in FIG. 1 as being part of the TBU 124, the TLB 122 could instead be implemented as part of or associated with the requester device 110, or in other embodiments the function of a TLB could be provided at both of the requested device 110 and the TBU 124. In some examples, the requester device 110 could be associated with a so-called "micro" TLB local to that requester device and the MMU could be associated with a "main" TLB.

The MMU 120 may be a single stage or a multiple stage (such as a two-stage) MMU comprising for example a stage 1 MMU and a stage 2 MMU.

In a single stage MMU, a VA to PA translation is conducted directly, using translation information (such as so-called page tables) established and overseen by, for example, an operating system (OS). The OS may be executed by the same PE (such as the requester device 110) as an application program or by a different PE, but typically the OS executes at a higher privilege or security level than an application program.

In an example two stage MMU, a VA required by an executing program or other system module such as the requester device 110 is translated to an intermediate physical address (IPA) by the stage 1 MMU. The IPA is translated to a physical address (PA) by the stage 2 MMU. One reason why multiple stage translation is used is for security of information handling when multiple operating systems (OS) may be in use on respective "virtual machines" running on the same processor. A particular OS is exposed to and oversees the VA to IPA translation, whereas only a hypervisor (software which oversees the running of the virtual machines) has oversight of the stage 2 (IPA to PA) translations. Typically, the hypervisor executes at a higher privilege or security level than the OS, which in turn typically executes at a higher privilege or security level than an application program.

Invalidation of Translation Information

Memory address translations (whether from VA to PA, or from VA to IPA to PA) are performed according to translation information as mentioned above. Such information may be buffered in a TLB or may form part of page table data (which itself might be cached in, for example a so-called walk cache).

The source of the translation information is the system which controls and oversees the translation process, which may typically (as discussed above) be an OS or a hypervisor. For various reasons, that overseeing system may have a requirement from time to time to invalidate at least a part of the translation information.

An invalidation can be defined, for example, in respect of a portion of the VAS, IPA space or PAS, and/or in terms of one or more sources of memory access transactions (such as peripheral devices), and/or by configuration details for the MMU operation and/or by other parameters which can be compared with properties of a memory access transaction.

One way to achieve this is for the oversight system to issue an invalidation. Such an invalidation transaction may be provided to the MMU by various routes, such as: (a) as a so-called DVM (distributed virtual memory management) message which a CPU, processing element or other requester can send to the interconnect 130 which then forwards it to the TCU, or (b) by the invalidation being written into a queue or buffer of commands in memory from which the TCU reads via the interface 132. Typically, the invalidation, once actioned by the TCU, may need to be forwarded on to other circuitry (such as the TBU 124) but before this can happen, the TCU is required to ensure that the invalidation transaction is checked against every memory transaction in progress, in order to detect whether that memory access transaction should itself be marked as invalidated. An invalidation transaction is not allowed to "overtake" memory access transactions and to propagate to other parts of the system (other circuitries) unless it can be guaranteed that no memory address translation that would have been invalidated by that invalidation transaction is allowed to propagate without itself being marked as invalidated.

Previously proposed arrangements for achieving this level of assurance involve the TCU checking the invalidation transaction against each in-progress translation before forwarding the invalidation transaction, for example to the TBU. This checking at the TCU can be costly in terms of processing resource and/or latency. In particular, performing the check in parallel at the TCU can be costly in terms of processing resource, as the number of transactions needing to be checked can be potentially large. However, performing the check in series at the TCU can be costly in terms of latency. In particular, because the check at the TBU can itself take a long time, it can be considered useful to be able to forward the invalidation to the TBU as early as possible.

Opportunistic Checking of Invalidations

Example embodiments use a so-called opportunistic technique for applying invalidations. In practical terms this notation implies that in response to an invalidation transaction the TCU can forward the invalidation transaction once it has put in place arrangements that can be guaranteed to ensure that no memory access transaction to which the invalidation should apply can leave the TCU without having been checked against the invalidation and (if appropriate) marked as invalidated. In other words, the forwarding of the invalidation transaction can be performed once such measures are in place, even though at that stage the check of each in progress memory access transaction has not yet been performed.

In at least many cases, this can avoid the need for a "walk" through in-progress transactions and so can potentially reduce a processing overhead in respect of the invalidation. Also it can potentially allow for the earlier forwarding of the invalidation transaction than would be possible under the previously proposed arrangements discussed above.

Figure 2:
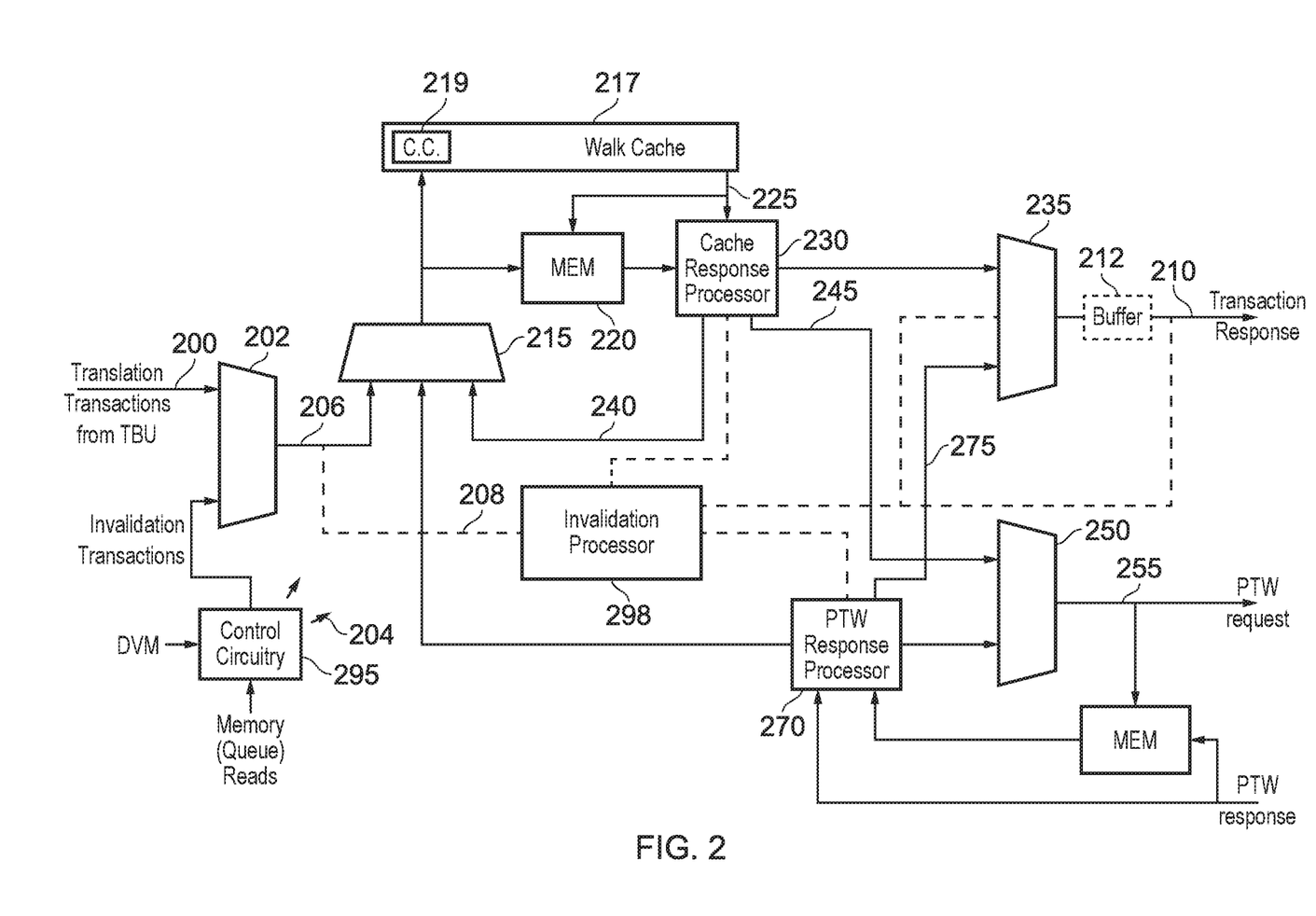
FIG. 2 schematically illustrates a memory management unit (MMU)

These techniques are implemented by an invalidation processor (as an example of invalidation circuitry) in or associated with the TCU 126, as discussed below Translation Control Unit FIG. 2 schematically illustrates at least a part of the operation of the TCU 126. The arrangement shown relates to a single stage MMU but similar techniques could be used in respect of a two stage or other multiple stage MMU, in which each stage could potentially follow the same arrangements (or alternatively the invalidation techniques to be discussed could apply to a subset of the stages).

In the form as drawn in FIG. 2, an incoming translation transaction is received from the TBU at an input 200 at the left side of the diagram as drawn and a transaction response 210 is provided at the right side of the diagram (responses potentially being buffered by an output buffer 212 shown in schematic form) to be returned to the TBU.

However, the incoming translation transactions are interspersed with invalidation transactions provided by control circuitry 295. The control circuitry 295 oversees operations of the whole arrangement as shown in FIG. 2 (as represented schematically by the diagonal arrows 204) but in the context of the input of invalidation transactions, it generates these in response to DVM messages and/or memory reads from the queue or buffer of instructions mentioned above. The interspersing of translation transactions and invalidation transactions is implemented by a schematic multiplexer 202. An output 206 of the multiplexer 202 therefore provides a stream of interspersed translation transactions and invalidation transactions, with no predetermined or other requirement on how many of each type contribute to the stream, nor any requirement on when an invalidation transaction arrives compared to the translation transactions.

Invalidation transactions are passed to an invalidation processor 298 by a schematic connection 208. The connection 208 allows for (a) the passing of invalidation transactions to the invalidation processor 298, (b) the counting and monitoring, by the invalidation processor 298 of transactions at the output 206, and (c) the provision of invalidation epochs to be associated with transactions at the output 206, as discussed below.

The incoming translation transactions are passed from the multiplexer 202 to a multiplexer 215 and form a cache lookup in a walk cache 217 (which operates under the control of a cache controller 219). The translation request properties are also stored in a memory 220 by which an identifier is associated with a walk cache lookup and with the properties stored in the memory 220, in order that when the response 225 comes back from the walk cache, it is reunited with the properties stored in the memory 222 according to the identifier and is passed to a cache response processor 230 for processing.

The walk cache stores information derived from previous page table walks. If the required information was held in the walk cache 217, then the processing by the cache response processor 230 may result in a usable translation response to be routed via a multiplexer 235 to the output 210. Another possibility, as represented schematically by routing 240, is that the processing causes a further cache lookup (for example to a next level page table). A further possibility, as represented by routing 245, is that the processing causes the initiation of a so-called page table walk (PTW) so that a multiplexer 250 forwards the output of the cache response processor as a PTW request 255.

The PTW request also has its properties stored in a memory 260, again in association with an identifier so that when the PTW response 265 is received, it is reunited with its properties stored in the walk cache 260 according to that identifier and is processed by a PTW response processor 270. The results of the processing may lead to a translation response as represented by routing 275, another PTW request as represented by routing 280 or indeed another cache lookup as represented by routing 285.

These aspects of operation of the MMU, and further aspects to be discussed below, are under the overall control of the control circuitry 295.

The invalidation processor 298 is associated with the input provided with incoming transactions 200, the cache response processor, the PTW response processor and the output providing the translation response 210. Aspects of operation of the invalidation processor 298 will be discussed further below.

Assignment of Invalidation Epochs

Figure 3:
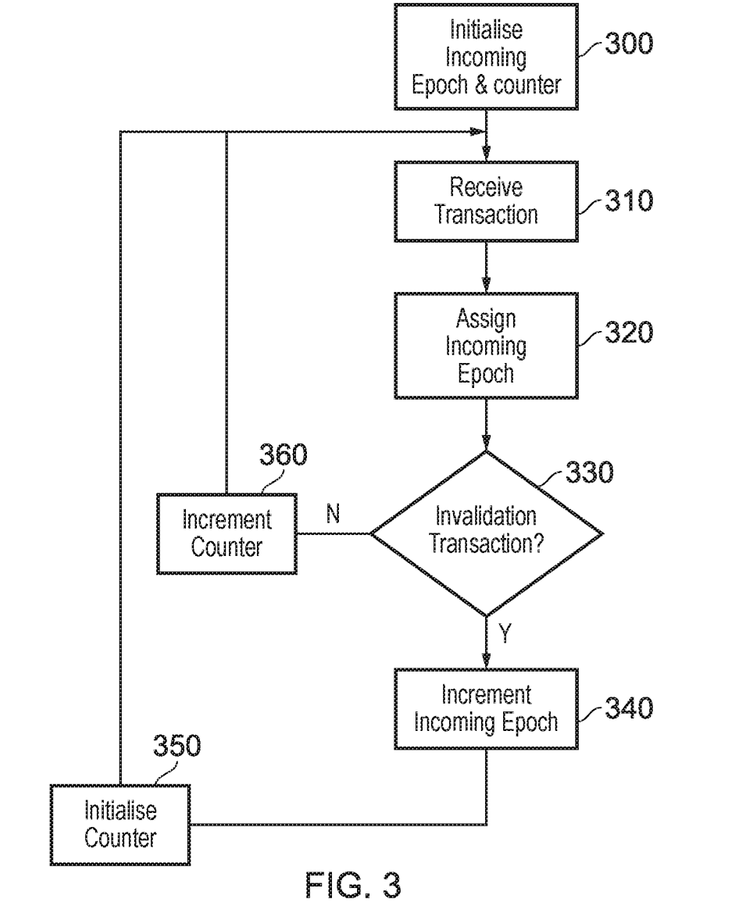
FIG. 3 is a schematic flowchart illustrating a method.

FIG. 3 is a schematic flowchart illustrating one aspect of the operation of the invalidation processor 298. This aspect relates to the assignment of so-called invalidation epochs.

As background, incoming transactions received at the input of the multiplexer 215 of FIG. 2 may comprise (i) memory access transactions requiring a memory address translation or (ii) invalidation transactions. The invalidation processor 298 assigns an "invalidation epoch" to each such transaction. The epoch may be a numerical identifier which (at least when first assigned) identifies a grouping of successively received transactions according to the order they were received relative to other transactions.

In some examples the epochs can be part of an ordered set or sequence of epochs so that the epoch to be assigned to incoming transactions can be "incremented" (moved to the next in the ordered set or sequence, even though this not be represented by a numerical "incrementing" or adding one to the epoch identifier). In some examples the ordered set or sequence may be a cyclic ordered set or sequence so that the sequence "wraps around" and returns to an initial epoch on performing an increment from the last epoch in the sequence. In some examples, at least twice as many epochs are provided in the ordered set as can potentially be "live" or in use at any one time. More generally, the transaction tracking circuitry is configured to associate a current invalidation epoch with each received translation transaction and each received invalidation transaction; and the transaction tracking circuitry is configured to change the current invalidation epoch to another invalidation epoch in the set of invalidation epochs in response to association of the current invalidation epoch with a received invalidation transaction.

However, the basic requirement is just that a group of transactions which need (or at least may need) to be checked against an invalidation can be associated with that invalidation. There is therefore no need for the identifiers to be sequential or cyclic; those features just make it potentially more straightforward to check a transaction against multiple invalidations in that they can provide an implicit or explicit association with a next invalidation to be checked using the techniques discussed below. In other examples, however, any identifier, even a random or pseudo-random number, could be assigned as an invalidation epoch, as long as it is unique with respect to any other invalidation epochs which are currently in use within the system. A list could be maintained globally or for each transaction of those invalidation epochs against which a transaction needs, or may need, to be checked, with entries being deleted from the list once a particular check has been performed.

Each epoch may have an associated counter which maintains a count of currently unchecked memory access transactions associated with that epoch.

Referring to FIG. 3, at a step 300, the invalidation processor initialiser initialises a so-called incoming epoch and its associated counter (by setting the counter to zero for example). This incoming epoch is assigned to each incoming transaction up to and including a next-received invalidation transaction. The counter is incremented for each translation transaction to which the invalidation epoch is assigned. In some examples, the counter is not incremented in respect of a transaction which does not need to be checked against the invalidation. Examples here may include transactions already marked as invalidated by upstream processing, transactions which do not relate to cached translation information at the TBU, or any class of transactions for which invalidations are architecturally disallowed.

So, with reference to FIG. 3, at a step 310 a next transaction is received and at a step 320 is assigned the incoming epoch.

If, at a step 330, the received transaction is in fact an invalidation transaction then control passes to a step 340 at which the incoming epoch is incremented or otherwise changed to a new incoming epoch and the counter associated with that new incoming epoch is initialised at a step 350, before control returns to the step 310.

If, on the other hand, the received transaction is detected not to be an invalidation transaction, then the counter associated with the prevailing incoming epoch is incremented or otherwise changed at a step 360 and control returns to the step 310.

This arrangement serves to associate with each invalidation transaction, a set of transactions received ahead of it and also a count of how many such transactions there are.

As mentioned above, the incrementing of the incoming epoch can be such that the incoming epoch is moved to a next epoch in an ordered sequence of invalidation epochs, such as a cyclic ordered sequence, but as discussed the sequence does not in fact need to be ordered or cyclic.

Figure 4:
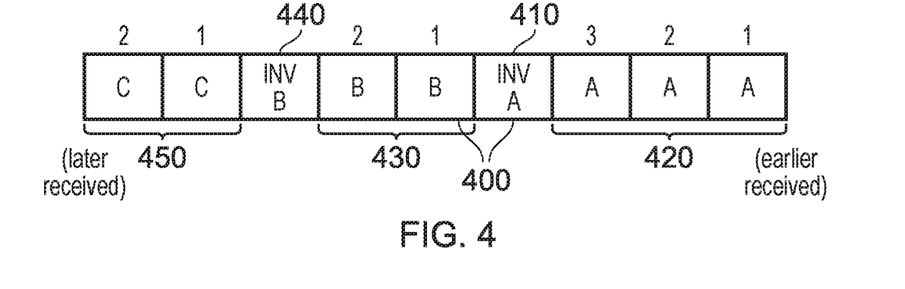
FIG. 4 schematically illustrates the assignment of epochs.

FIG. 4 schematically illustrates the process shown in FIG. 3 in terms of an example series of transactions represented by individual rectangles 400, with earlier received transactions being drawn at the right side of FIG. 4 and later received transactions being drawn at the left side of FIG. 4. Epochs (in sequence order) are represented in this example as epochs A, B, C . . . .

Assume that the incoming epoch is first initialised to an epoch "A" and that three transactions are received before an invalidation transaction 410. Each of the three received transactions 420 is associated with the incoming epoch A as is the invalidation transaction 410. The counter is incremented at each non-invalidation transaction and count values 1, 2, 3 are shown above each respective transaction. The counter for epoch A therefore reaches the value of 3 at a final application of the step 360 of FIG. 3 in respect of the epoch A.

In response to the invalidation transaction 410, the incoming epoch is incremented at the step 340 to the epoch "B" and the counter associated with epoch B is initialised. Then, as transactions 430 are received, they are associated with the incoming epoch B and the counter is incremented 1, 2. The counter for epoch B reaches the value of 2. A next invalidation transaction 440 is also associated with epoch B and the incoming epoch is then incremented to a next epoch in the ordered sequence, "C" and the counter associated with epoch C is reset to 0. Subsequently received transactions 450 are associated with invalidation epoch C and the counter is incremented at each one.

FIGS. 3 and 4 above deal with the allocation of invalidation epochs by the invalidation processor 298. Further aspects of the operation of the invalidation processor 298 involving the opportunistic application of invalidations will now be described.

Therefore the invalidation processor 298 acts here as transaction tracking circuitry configured to associate the current invalidation epoch with each received translation transaction and each received invalidation transaction; and to change a current epoch to a next epoch in the ordered sequence of invalidation epochs in response to association of the current invalidation epoch with a received invalidation transaction.

Note that a given transaction is within the scope of all invalidations arriving after it. So, for example, each of the transactions 420 is initially associated with the invalidation epoch A but once they have been checked against the invalidation 410, they then require checking against the invalidation B and so on. This point will be discussed further below with regard to the incrementing and decrementing of the counters.

Further Operations of the Invalidation Processor

Figure 5:
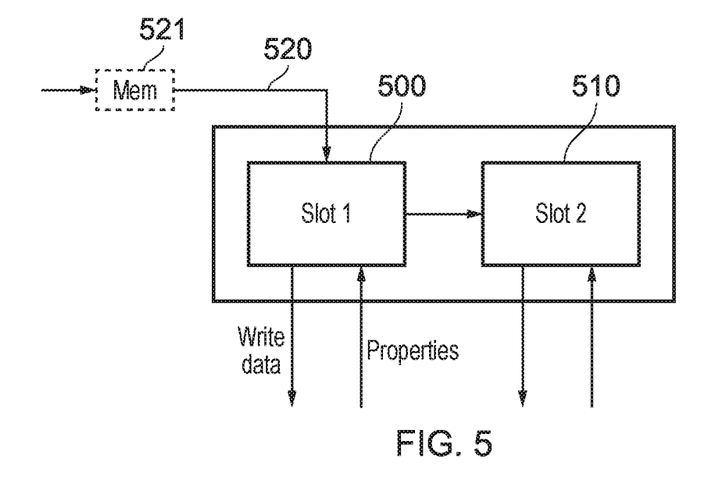
FIGS. 5 and 6 schematically illustrate aspects of an invalidation processor.

As an overview, FIG. 5 schematically illustrates an aspect of the operation of the invalidation processor in order in that it has multiple so-called "slots" 500, 510. It is noted that two such slots are schematically represented in FIG. 5, but a different number may be provided.

Each slot provides a representation of processing circuitry to apply an individual invalidation on an opportunistic basis.

An invalidation transaction 520 is provided to one (500) of the slots and, depending upon features of the operation to be discussed below, the invalidation transaction previously held by the slot 500 may be provided to the slot 510. Each of the slots is associated with comparison and other circuitry to enable the detection of properties of transactions and the writing of invalidation flags, markers or other data relating to those transactions.

Figure 6:
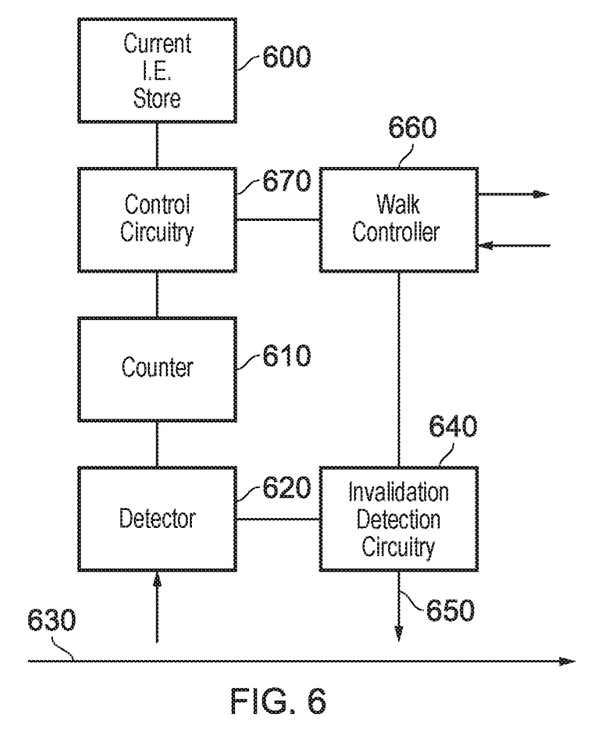

FIG. 6 schematically illustrates an example arrangement relating to one of the slots 500, 510 of FIG. 5. Multiple such slots can be provided (for example, more than two), because the additional processing overhead associated with each additional slot is relatively low.

An invalidation epoch store 600 holds the invalidation epoch currently being processed by that slot. A counter 610 is initialised to the count generated by the step 360 of FIG. 3, in other words to the value of that counter when the invalidation transaction which reset the count and incremented the incoming epoch was received. So, the counter 610 is initialised to the total number of earlier received transactions to which the invalidation epoch could apply.

The checking of transactions can be performed at a relatively limited number of locations with respect to the MMU circuitry while still providing the guarantee discussed above. For example these can be locations with respect to the circuitry at which architecturally specified behaviour is observable, for example at the output (shown generically as an output 630) of the buffer 212, the cache response processor 230, and of the PTW response processor 270. The use of "architecturally specified" locations indicates locations within the circuitry at which the transactions are observable (which is the significance of the architectural specification). This feature is potentially significant because it has the effect that the invalidation processor 298 can interact with the transactions at those locations without necessarily needing additional memory read or write operations or additional latency. In turn this can imply that the impact (or cost) with relation to the performance of the transaction processing operations is low or zero.

A detector 620 detects properties of transactions at the output 630. Invalidation detection circuitry 640 is arranged to selectively associate an invalidation flag 650 with a transaction at the output 630, in dependence upon whether the invalidation (or whatever parameters are associated with the invalidation as discussed above) is detected to apply to that transaction. As discussed below, checking is performed (a) at the output of the buffer 212, and also (b) at the outputs of the cache response processor 230 and the PTW response processor 270.

Once a transaction has been checked, whether or not the invalidation flag was applied, two further things are performed: (a) the counter associated with that invalidation epoch is decremented, to show that there remains one fewer transaction still to be checked in that invalidation epoch; and (b) the invalidation epoch associated with that newly checked transaction is changed to a replacement epoch. This replacement epoch may be an invalidation epoch, no earlier in the ordered sequence (or for non-ordered epochs, no earlier assigned) than the just-checked epoch, for which the invalidation circuitry does not currently store data defining an associated invalidation transaction. So, for example, in the case of a two-slot invalidation processor, a check against a transaction causes the invalidation epoch of that transaction to be changed to a next epoch later than both of those in the two slots, or in other words an invalidation epoch for which the invalidation processor does not currently store data defining an associated invalidation transaction. More generally, the replacement epoch may be one which was associated as a current epoch no earlier, with reference to the received transactions, than the invalidation epoch associated with the given invalidation transaction.

In connection with the generic representation of the output 630, this arrangement provides an example in which the address translation circuitry comprises one or more (or in examples, two or more) successive processing portions (such as 230, 270); and the invalidation processor is configured to process translation transactions in response to those translation transactions being handled by each of the one or more successive processing portions, for example in which the invalidation circuitry is configured to process translation transactions in response to those translation transactions being output by each of the one or more successive processing portions.

A walk controller 660 is configured under circumstances to be discussed below to step through all in-progress transactions being handled by the MMU (or at least being handled by the cache response processor and the PTW response processor) and to detect whether any of them should be invalidated. Operation of the walk controller 660 and the circumstances in which its operation is initiated will be discussed further below.

The arrangement of FIG. 6 is under the control of control circuitry 670.

Therefore, the apparatus of FIGS. 1, 5 and 6 operating as discussed above provides an example of apparatus comprising:

address translation circuitry 120 configured to access translation data defining a set of memory address translations;

transaction handling circuitry (implemented as 120, 215) to receive translation transactions and to receive invalidation transactions, each translation transaction defining one or more input memory addresses in an input memory address space to be translated to respective output memory addresses in an output memory address space, in which the transaction handling circuitry is configured to control the address translation circuitry to provide the output memory address as a translation response;

in which each invalidation transaction defines at least a partial invalidation of the translation data;

transaction tracking circuitry 298 to associate an invalidation epoch, of a set of at least two invalidation epochs, with each translation transaction and with each invalidation transaction; and invalidation circuitry 298 (600, 610) to store data defining a given invalidation transaction and, for translation transactions having the same invalidation epoch as the given invalidation transaction and handled by the address translation circuitry subsequent to the invalidation circuitry storing the data defining the given invalidation transaction, to process those translation transactions to indicate that a translation transaction is invalidated when the invalidation defined by the given invalidation transaction applies to that translation transaction;

the invalidation circuitry being configured to forward at least an acknowledgement of the invalidation transaction for further processing by other apparatus in response to storage of the data by the invalidation circuitry.

Output Buffer Checking

The checking of transactions at the output of the cache response processor and the PTW response processor may not, in some situations, be sufficient to provide the guarantee discussed above. In order to be able to implement the forwarding of the invalidation transaction and to be sure that the guarantee applies, in some examples it is also appropriate to confirm that no transactions which at least need to be checked against the invalidation are currently buffered for output. This can also be performed by the detector 620 according to the technique of FIG. 7 below.

This provides an example in which the MMU comprises one or more instances of output buffer circuitry 212 to store translation transactions handled by the address translation circuitry; in which the invalidation processor is configured to detect, before the invalidation circuitry forwards at least the acknowledgement of the invalidation transaction, that no translation transactions the same invalidation epoch as the given invalidation transaction are present in the output buffer circuitry.

Figure 7:
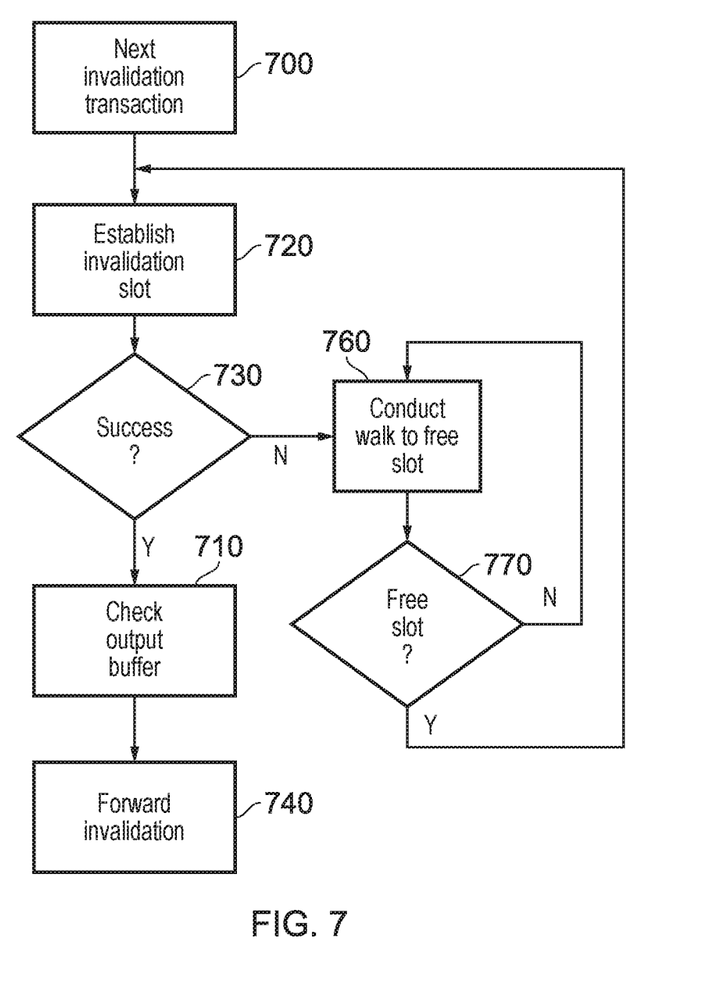
FIGS. 7-10 are schematic flowcharts illustrating respective methods.

Note that when a transaction leaves the TCU at the output 210, the counter is decremented for all invalidation epochs in which it is still included or to which it is still potentially relevant—this includes those causing opportunistic invalidation, those waiting for a slot, and the "incoming" epoch that is not yet associated with an invalidation transaction.
Initiation of Opportunistic Invalidation FIG. 7 is a schematic flowchart illustrating operations in respect of a next invalidation transaction to be processed.

In response to the next invalidation transaction 700, which may be (prior to these steps) held by a memory 521 associated with the invalidation circuitry to store a queue of one or more invalidation transactions to be processed by the invalidation circuitry, an attempt is made at a step 720 to establish an invalidation slot for that invalidation transaction, which is to say, as discussed above, that the invalidation transaction is stored to a free slot in the invalidation processor 298.

When, as detected at a step 730, this is successful, control passes to a step 710 at which a check is made that no transaction remains in the output buffer(s) 212 to which that invalidation could apply. This is done by the detector 620 checking that (or waiting for the situation in which) any transaction being output at the output 210 has an invalidation epoch later assigned than the current epoch being checked. When the step 710 is complete, then the MMU 120 is in a state in which it can be assured that no transaction to which the invalidation ought to apply will leave the MMU without having been invalidated. So, although the invalidation has not necessarily been completed by this stage, a so-called lazy or opportunistic detection and invalidation system has been established to the extent that no transaction can leave the MMU without having been appropriately handled. Therefore, at this stage, the invalidation can be forwarded to other circuitry such as the TBU for handling at a step 740.

If however the outcome at the step 730 is negative, because the invalidation processor 298 did not have a free slot available, then control passes to a step 760 at which a so-called walk is conducted in order to free a slot. This involves the walk controller 660 detecting each in-progress transaction at the cache response processor and the PTW response processor in turn and selectively applying the invalidation to that transaction. Each time, the count associated with that invalidation is decremented and when it reaches 0 the invalidation currently occupying that slot can be retired and the slot is vacated for the newly processed transaction. In other words, the invalidation processor is configured to retire an invalidation transaction in response to the count value for the invalidation epoch associated with that invalidation transaction indicating that there remain no translation transactions associated with that invalidation epoch which have not yet been processed by the invalidation circuitry.

The step 760 provides an example of an operation in which the invalidation processor is configured to selectively complete processing of an invalidation transaction for which the invalidation circuitry is currently storing data, to allow the invalidation circuitry to accept a next invalidation transaction from the queue, by detecting, while the count value indicates more than zero, each translation transaction currently in progress of being handled by the address translation circuitry and, when a translation transaction currently in progress has the same invalidation epoch as the invalidation transaction to be completed, decrementing the count value and selectively applying the invalidation to that translation transaction.

The step 770 is repeated if necessary (and if detected at a step 770) until a free slot is available.

Note that while an invalidation is waiting for a free slot it is not being checked against transactions, but its counter can be changed while it is waiting in the queue.

Figure 8:
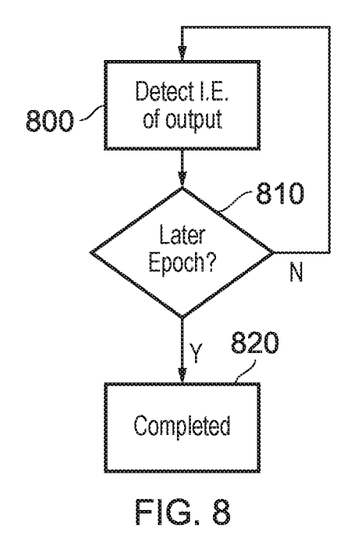

FIG. 8 schematically illustrates aspects of the step 710 which is conducted with respects to the output 210 for example.

At a step 800, the invalidation processor 298 detects the invalidation epoch of a current transaction at the output 210. If, at a step 810, this is a later epoch than the invalidation epoch under consideration, then the step 710 is considered complete at a step 820 because there can be no relevant transaction still held in output buffers or the like which need to be checked against the current invalidation. If not, however, control returns to the step 800.

Figure 9:
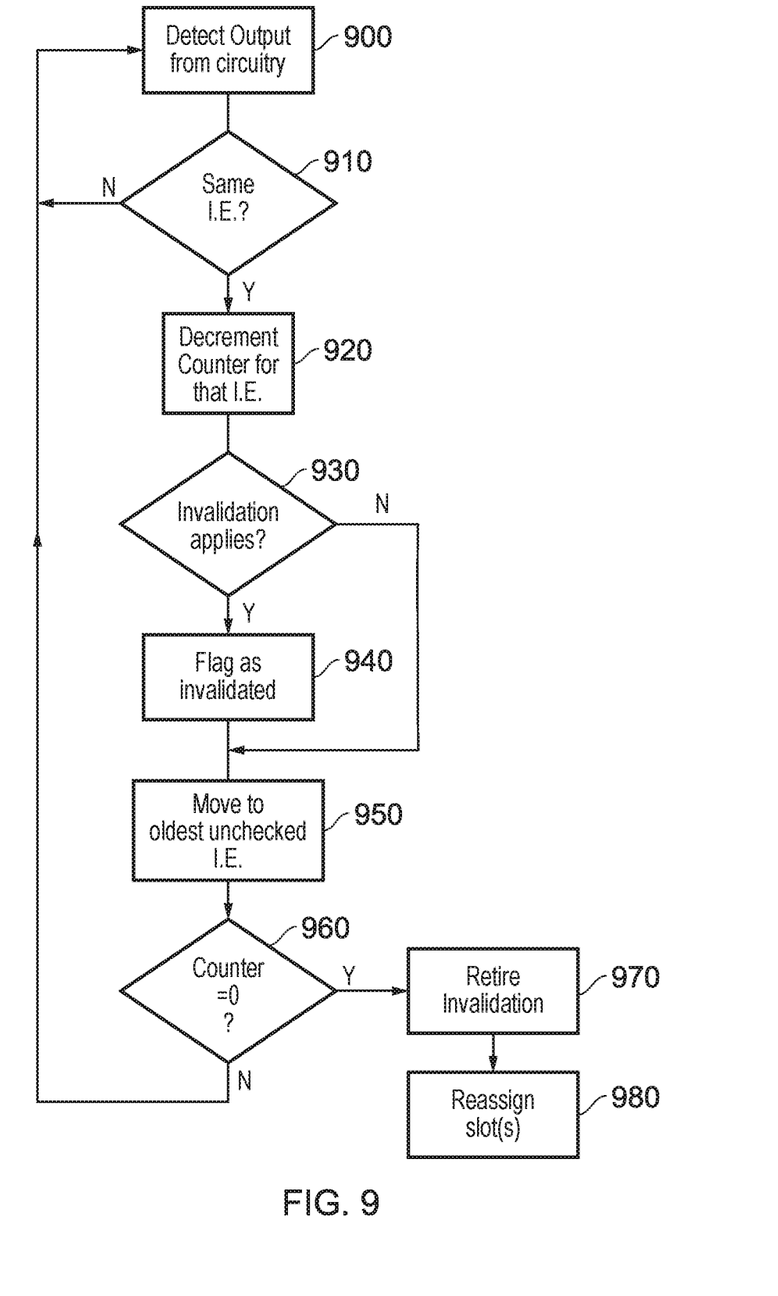

FIG. 9 schematically represents the operations of the apparatus of FIG. 6 in relation to the outputs of the cache response processor 230 and/or the PTW response processor 280. Note that these steps may be performed in parallel or otherwise in respect of each of the slots of the invalidation processor.

Such an output is detected at a step 900 and is checked at a step 910 to detect whether it has the same invalidation epoch as the current invalidation epoch stored by the storage 600. If the answer is yes then control passes to a step 920. If no, then control returns to the step 900 for the next transaction at that output to be checked.

In other words, the invalidation processor is configured to store data defining two or more invalidation transactions and to process translation transactions having the same invalidation epoch as any of the two or more invalidation transactions.

The step 920 involves decrementing the counter for that invalidation epoch and then, at a step 930 detecting whether the invalidation applies to that transaction. If the answer is yes then at step 940 the transaction is flagged as invalidated. Either the negative outcome of the step 930 or the output of the step 940 passes control to a step 950 at which that transaction has its invalidation epoch changed to that of the oldest currently unchecked invalidation epoch as discussed above.

Note that, with regard to the step 920, in the case of an invalidation processor with multiple slots (as in the example of FIG. 5), a transaction is processed against potentially multiple invalidations in parallel. The counters for each of those checked invalidation epochs are therefore decremented and the transaction leaves each of those invalidation epochs. At a step 960, if the counter associated with the current invalidation epoch has reached 0, then at a step 970 the invalidation is retired and at a step 980 the relevant slot is made available to be reassigned to another invalidation. If the outcome at the step 960 is negative, then control passes back to the step 900 to receive the next output from the relevant circuitry.

Summary Method

Figure 10:
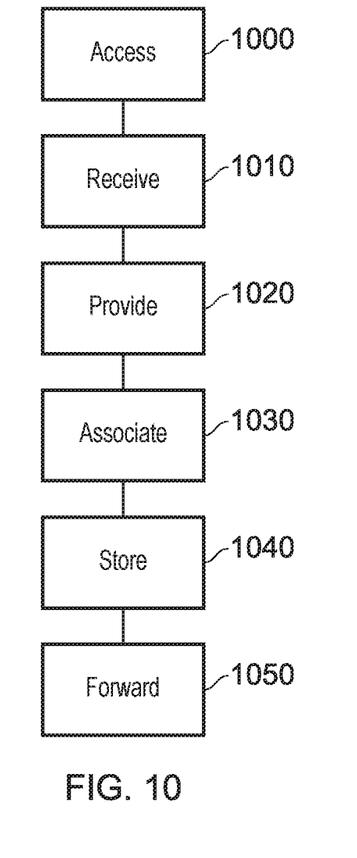

FIG. 10 is a schematic flowchart illustrating a method comprising:

accessing (at a step 1000) translation data defining a set of memory address translations;

receiving (at a step 1010) translation transactions and to receive invalidation transactions, each translation transaction defining one or more input memory addresses in an input memory address space to be translated to respective output memory addresses in an output memory address space, in which each invalidation transaction defines at least a partial invalidation of the translation data;

providing (at a step 1020) the output memory address as a translation response;

associating (at a step 1030) an invalidation epoch, of a set of at least two invalidation epochs, with each translation transaction and with each invalidation transaction; and storing (at a step 1040) data defining a given invalidation transaction and, for translation transactions having the same invalidation epoch as the given invalidation transaction and handled subsequent to the storing of the data defining the given invalidation transaction, and processing those translation transactions to indicate that a translation transaction is invalidated when the invalidation defined by the given invalidation transaction applies to that translation transaction; and forwarding (at a step 1050) at least an acknowledgement of the invalidation transaction for further processing in response to the storing of the data by the invalidation circuitry.

Simulator Implementation

Figure 11:
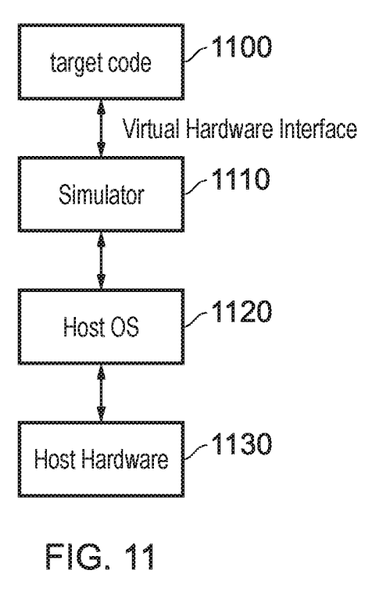
FIG. 11 schematically illustrates a simulator implementation.

FIG. 11 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1130, optionally running a host operating system 1120, supporting the simulator program 1110. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1130), some simulated embodiments may make use of the host hardware, where suitable.

The simulator program 1110 may be stored on a computer-readable storage medium (which may be a non-transitory medium), and provides a program interface (instruction execution environment) to the target code 1100 (which may include applications, operating systems and a hypervisor) which is the same as the interface of the hardware architecture being modelled by the simulator program1 1110. Thus, the program instructions of target code 1100, including the features described above, may be executed from within the instruction execution environment using the simulator program 1110, so that a host computer 1130 which does not actually have the hardware features of the apparatus discussed above can emulate these features.

The arrangement of FIG. 11 therefore provides an example of a computer program for controlling a host data processing apparatus to provide an instruction execution environment comprising:

address translation circuitry configured to access translation data defining a set of memory address translations;

transaction handling circuitry to receive translation transactions and to receive invalidation transactions, each translation transaction defining one or more input memory addresses in an input memory address space to be translated to respective output memory addresses in an output memory address space, in which the transaction handling circuitry is configured to control the address translation circuitry to provide the output memory address as a translation response;

in which each invalidation transaction defines at least a partial invalidation of the translation data;

transaction tracking circuitry to associate an invalidation epoch, of a set of at least two invalidation epochs, with each translation transaction and with each invalidation transaction; and invalidation circuitry to store data defining a given invalidation transaction and, for translation transactions having the same invalidation epoch as the given invalidation transaction and handled by the address translation circuitry subsequent to the invalidation circuitry storing the data defining the given invalidation transaction, to process those translation transactions to indicate that a translation transaction is invalidated when the invalidation defined by the given invalidation transaction applies to that translation transaction;

the invalidation circuitry being configured to forward at least an acknowledgement of the invalidation transaction for further processing by other apparatus in response to storage of the data by the invalidation circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function, in which case software or program instructions by which the function is performed, and a providing medium such as a non-transitory machine-readable medium by which such software or program instructions are provided (for example, stored) are considered to represent embodiments of the disclosure. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Apparatus comprising:
   address translation circuitry configured to access translation data defining a set of memory address translations;
   transaction handling circuitry to receive translation transactions and to receive invalidation transactions, each translation transaction defining one or more input memory addresses in an input memory address space to be translated to respective output memory addresses in an output memory address space, in which the transaction handling circuitry is configured to control the address translation circuitry to provide the output memory address as a translation response;
   in which each invalidation transaction defines at least a partial invalidation of the translation data;
   transaction tracking circuitry to associate an invalidation epoch, of a set of at least two invalidation epochs, with each translation transaction and with each invalidation transaction; and
   invalidation circuitry to store data defining a given invalidation transaction and, for translation transactions having a same invalidation epoch as the given invalidation transaction and handled by the address translation circuitry subsequent to the invalidation circuitry storing the data defining the given invalidation transaction, to process those translation transactions to indicate that a translation transaction of those translation transactions is invalidated when an invalidation defined by the given invalidation transaction applies to that translation transaction;
   the invalidation circuitry being configured to forward at least an acknowledgement of the invalidation transaction for further processing by other apparatus in response to storage of the data by the invalidation circuitry.

2. The apparatus of claim 1, in which:
   the transaction tracking circuitry is configured to associate a current invalidation epoch with each received translation transaction and each received invalidation transaction; and
   the transaction tracking circuitry is configured to change the current invalidation epoch to another epoch in the set of invalidation epochs in response to association of the current invalidation epoch with a received invalidation transaction.

3. The apparatus of claim 2, in which:
   the set of at least two invalidation epochs comprises an ordered sequence of invalidation epochs; and
   the transaction tracking circuitry is configured to change the current invalidation epoch to a next epoch in the ordered sequence of invalidation epochs in response to association of the current invalidation epoch with a received invalidation transaction.

4. The apparatus of claim 3, in which the ordered sequence of epochs is a cyclic ordered sequence of epochs.

5. The apparatus of claim 2, in which the invalidation circuitry is configured, in response to processing of a translation transaction, to associate that translation transaction with a replacement epoch associated as a current epoch no earlier, with reference to the received transactions, than the invalidation epoch associated with the given invalidation transaction.

6. The apparatus of claim 5, in which the replacement epoch is an invalidation epoch for which the invalidation circuitry does not currently store data defining an associated invalidation transaction.

7. The apparatus of claim 1, in which:
   the invalidation circuitry is configured to generate a count value indicative of a number of translation transactions associated with each invalidation epoch; and
   the invalidation circuitry is configured, in response to processing by the address translation circuitry of a translation transaction having the same invalidation epoch as the given invalidation transaction, to decrement the count value.

8. The apparatus of claim 7, in which:
   the invalidation circuitry is configured to retire an invalidation transaction in response to the count value for the invalidation epoch associated with that invalidation transaction indicating that there remain no translation transactions associated with that invalidation epoch which have not yet been processed by the invalidation circuitry.

9. The apparatus of claim 7, comprising memory associated with the invalidation circuitry to store a queue of one or more invalidation transactions to be processed by the invalidation circuitry.

10. The apparatus of claim 9, in which the invalidation circuitry is configured to selectively complete processing of an invalidation transaction for which the invalidation circuitry is currently storing data, to allow the invalidation circuitry to accept a next invalidation transaction from the queue, by detecting, while the count value indicates more than zero, each translation transaction currently in progress of being handled by the address translation circuitry and, when the translation transaction currently in progress has the same invalidation epoch as the invalidation transaction to be completed, decrementing the count value and selectively applying the invalidation to that translation transaction.

11. The apparatus of claim 1, comprising:
    one or more instances of output buffer circuitry to store translation transactions handled by the address translation circuitry;
    in which the invalidation circuitry is configured to detect, before the invalidation circuitry forwards at least the acknowledgement of the invalidation transaction, that no translation transactions the same invalidation epoch as the given invalidation transaction are present in the output buffer circuitry.

12. The apparatus of claim 1, in which:
the address translation circuitry comprises one or more successive processing portions;
the invalidation circuitry is configured to process translation transactions in response to those translation transactions being handled by each of the one or more successive processing portions.

13. The apparatus of claim 12, in which the invalidation circuitry is configured to process translation transactions in response to those translation transactions being output by each of the one or more successive processing portions.

14. The apparatus of claim 13, in which the invalidation circuitry to store data defining two or more invalidation transactions and to process translation transactions having the same invalidation epoch as any of the two or more invalidation transactions.

15. The apparatus of claim 12, in which the address translation circuitry comprises two or more successive processing portions.

16. A method comprising:
accessing translation data defining a set of memory address translations;
receiving translation transactions and to receive invalidation transactions, each translation transaction defining one or more input memory addresses in an input memory address space to be translated to respective output memory addresses in an output memory address space, in which each invalidation transaction defines at least a partial invalidation of the translation data;
providing the output memory address as a translation response;
associating an invalidation epoch, of a set of at least two invalidation epochs, with each translation transaction and with each invalidation transaction; and
storing data defining a given invalidation transaction and, for translation transactions having a same invalidation epoch as the given invalidation transaction and handled subsequent to the storing of the data defining the given invalidation transaction, and processing those translation transactions to indicate that a translation transaction of those translation transactions is invalidated when an invalidation defined by the given invalidation transaction applies to that translation transaction; and
forwarding at least an acknowledgement of the invalidation transaction for further processing in response to the storing of the data by the invalidation circuitry.

17. A non-transitory, machine-readable storage medium which stores a computer program for controlling a host data processing apparatus to provide an instruction execution environment comprising:
address translation circuitry configured to access translation data defining a set of memory address translations;
transaction handling circuitry to receive translation transactions and to receive invalidation transactions, each translation transaction defining one or more input memory addresses in an input memory address space to be translated to respective output memory addresses in an output memory address space, in which the transaction handling circuitry is configured to control the address translation circuitry to provide the output memory address as a translation response;
in which each invalidation transaction defines at least a partial invalidation of the translation data;
transaction tracking circuitry to associate an invalidation epoch, of a set of at least two invalidation epochs, with each translation transaction and with each invalidation transaction; and
invalidation circuitry to store data defining a given invalidation transaction and, for translation transactions having a same invalidation epoch as the given invalidation transaction and handled by the address translation circuitry subsequent to the invalidation circuitry storing the data defining the given invalidation transaction, to process those translation transactions to indicate that a translation transaction of those translation transactions is invalidated when an invalidation defined by the given invalidation transaction applies to that translation transaction;
the invalidation circuitry being configured to forward at least an acknowledgement of the invalidation transaction for further processing by other apparatus in response to storage of the data by the invalidation circuitry.

* * * * *